United States Patent
Noguchi et al.

(10) Patent No.: US 6,997,624 B2
(45) Date of Patent: Feb. 14, 2006

(54) IMAGE FORMING APPARATUS AND IMAGE FORMING METHOD

(75) Inventors: Kazuyoshi Noguchi, Toyokawa (JP); Yoshihiko Hirota, Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 136 days.

(21) Appl. No.: 10/630,699

(22) Filed: Jul. 31, 2003

(65) Prior Publication Data

US 2004/0028442 A1    Feb. 12, 2004

(30) Foreign Application Priority Data

Aug. 8, 2002    (JP)    ............................ 2002-231142

(51) Int. Cl.
*B41J 11/44*    (2006.01)
*B41J 5/30*    (2006.01)

(52) U.S. Cl. .......................... 400/76; 400/61
(58) Field of Classification Search ................. 400/76, 400/61; 347/239, 131, 252; 358/3.24, 3.02
See application file for complete search history.

(56) References Cited

U.S. PATENT DOCUMENTS

| | | | | |
|---|---|---|---|---|
| 5,467,422 A | * | 11/1995 | Itihara et al. | 358/3.02 |
| 5,739,842 A | * | 4/1998 | Murata | 347/252 |
| 5,790,272 A | * | 8/1998 | Goto et al. | 358/3.24 |
| 6,809,469 B1 | * | 10/2004 | Ito et al. | 313/495 |
| 6,873,350 B1 | * | 3/2005 | Saito et al. | 347/239 |

FOREIGN PATENT DOCUMENTS

| | | |
|---|---|---|
| JP | 05-292319 | 11/1993 |
| JP | 08-294005 | 11/1996 |

* cited by examiner

*Primary Examiner*—Daniel J. Colilla
*Assistant Examiner*—Wasseem H. Hamdan
(74) *Attorney, Agent, or Firm*—Buchanan Ingersoll PC

(57) ABSTRACT

1,800 dpi binary image data is divided into 3-bit data groups or 2-bit data groups, and is input from an input unit 11 to a tone setting unit 12 and a print position controller 13. Each group of 3-bit image data is converted into 8-bit tone data and 2-bit attribute data by the tone setting unit 12 and the print position controller 13, respectively, and both sets of post-conversion data are input to a pulse width modulation unit 15 at the same time. Because all 3-bit data is handled at the same time, the input and output operation clock signals can stay the same as for a 600 dpi resolution.

6 Claims, 5 Drawing Sheets

Fig. 2

| LEFT | CENTER | RIGHT | BOTH END |
|---|---|---|---|
| 01 | 00 | 10 | 11 |

Fig. 3

| Number of "1" | Tone Data [7:0] |
|---|---|
| 0 | 8'd0 |
| 1 | 8'd85 |
| 2 | 8'd170 |
| 3 | 8'd255 |

Fig. 4

| Input Data [2:0] (22) | Attribute Data [1:0] (23) | Tone Data [7:0] (24) |
|---|---|---|
| 000 | 00 | 8'd0 |
| 001 | 01 | 8'd85 |
| 010 | 00 | 8'd85 |
| 011 | 01 | 8'd170 |
| 100 | 10 | 8'd85 |
| 101 | 11 | 8'd170 |
| 110 | 10 | 8'd170 |
| 111 | 00 | 8'd255 |

| Number of "1" | Tone Data [7:0] |
|---|---|
| 0 | 8'd0 |
| 1 | 8'd128 |
| 2 | 8'd255 |

| Input Data [1:0] | Attribute Data [1:0] | Tone Data [7:0] |
|---|---|---|
| 00 | 00 | 8'd0 |
| 01 | 01 | 8'd128 |
| 10 | 10 | 8'd128 |
| 11 | 00 | 8'd255 | ers than the frequency of the pixel clock.

IMAGE FORMING APPARATUS AND IMAGE FORMING METHOD

This application is based on application No. 2002-231142 filed in Japan, the content of which is hereby incorporated by reference.

BACKGROUND OF THE INVENTION

1. Field of the Invention

The present invention relates to an image forming apparatus that is mounted in a laser printer, copying machine or the like, as well as to an image forming method, and more particularly, to a high-speed image forming apparatus and an image forming method applied in a high-speed apparatus.

2. Description of the Related Art

According to the conventional art, in an image forming apparatus such as a laser printer, a laser beam that is emitted toward the scanned member is switched ON or OFF based on a pulse output by a pulse width modulation unit, because a pulse width modulation unit can control the width of the laser beam for one dot based on the width of the output pulse, thereby enabling gradation imaging. The pulse width modulation unit receives input of image data, and outputs a pulse in synchronization with an output pixel clock signal, which is an operation clock signal for the image output section. In such a laser printer, the resolution in the main scanning direction is determined based on the number of dots in a line. The number of printed dots corresponds to the number of times the laser beam is turned ON and OFF by the pulse width modulation unit. In other words, the number of dots in a line corresponds to the number of output pixel clock signals for a line. Accordingly, the resolution in the main scanning direction depends on the frequency of the output pixel clock signal.

In the conventional image forming apparatus described above, in order to increase the resolution in the main scanning direction, the frequency of the output pixel clock signal should be increased. However, if the frequency of the output pixel clock signal is increased, the operation frequency for the image processing section that generate image data to be input to the pulse width modulation unit must be increased as well, or else the generation of image data would not keep up with the image output. This makes it very difficult for high-speed apparatuses that already carry out processing at a speed near the maximum operation speed of the image processing section to further increase the resolution.

SUMMARY OF THE INVENTION

According to one aspect of the present invention, an image forming apparatus that receives image data and forms an image based on the image data, the image forming apparatus comprises a dividing unit that divides the input image data into data groups based on a prescribed number of pixels in main scanning direction; a tone setting unit that sets tone for each data group created by the dividing unit based on the number of pixels having a prescribed value in the data group; a position attribute setting unit that sets the position attribute for each data group created by the dividing unit based on arrangement of pixels having a prescribed value in the data group; and a pulse width modulation unit that performs pulse width modulation in response to a driving clock signal corresponding to a resolution of the input image data divided by the number of pixels in a data group created by the dividing unit, wherein the pulse width modulation unit performs exposure of each pixel for output image based on the pulse width in accordance with the tone set by the tone setting unit and the intra-group position in accordance with the position attribute set by the position attribute setting unit.

According to another aspect of the present invention, an image forming method for receiving image data and forming an image based on the image data, the image forming method comprises the steps of: dividing the input image data into data groups based on a prescribed number of pixels in main scanning direction; setting the tone for each data group based on the number of pixels having a prescribed value in the data group; setting position attribute for each data group based on arrangement of pixels having a prescribed value in the data group; performing pulse width modulation in response to a driving clock signal corresponding to a resolution of the input image data divided by the number of pixels in one data group; and performing exposure of each pixel of the output image based on the pulse width in accordance with the tone set by the tone setting unit and the intra-group position in accordance with the position attribute set by the position attribute setting unit.

According to another aspect of the present invention, an image forming apparatus, comprises: a dividing unit that divides input image data into data groups based on a prescribed number of pixels; a setting unit that sets tone data and position attribute for each data group created by the dividing unit based on number of pixels having a prescribed pixel value in the data group; and a pulse width modulation unit that performs pulse width modulation for each pixel in the output image, in response to driving clock signals corresponding to the input image data resolution divided by the number of pixels in a data group created by the dividing unit, based on pulse width and intra-group pixel position according to the tone and position attribute set by the setting unit.

BRIEF DESCRIPTION OF THE DRAWINGS

These and other objects and features of this invention will become clear from the following description, taken in conjunction with the preferred embodiments with reference to the accompanied drawings in which:

FIG. 2 is a drawing showing the relationship between the attribute data and the printing position regarding the pulse width modulation unit;

FIG. 3 is a drawing showing the relationship between the input data and the tone data regarding the tone setting unit;

FIG. 4 is a drawing showing a conversion table pertaining to the first embodiment;

DETAILED DESCRIPTION OF THE PREFERRED EMBODIMENTS

Embodiments are described in detail below with reference to the accompanying drawings. Each embodiment is applied to an image forming apparatus such as a laser printer.

First Embodiment

Figure 1:
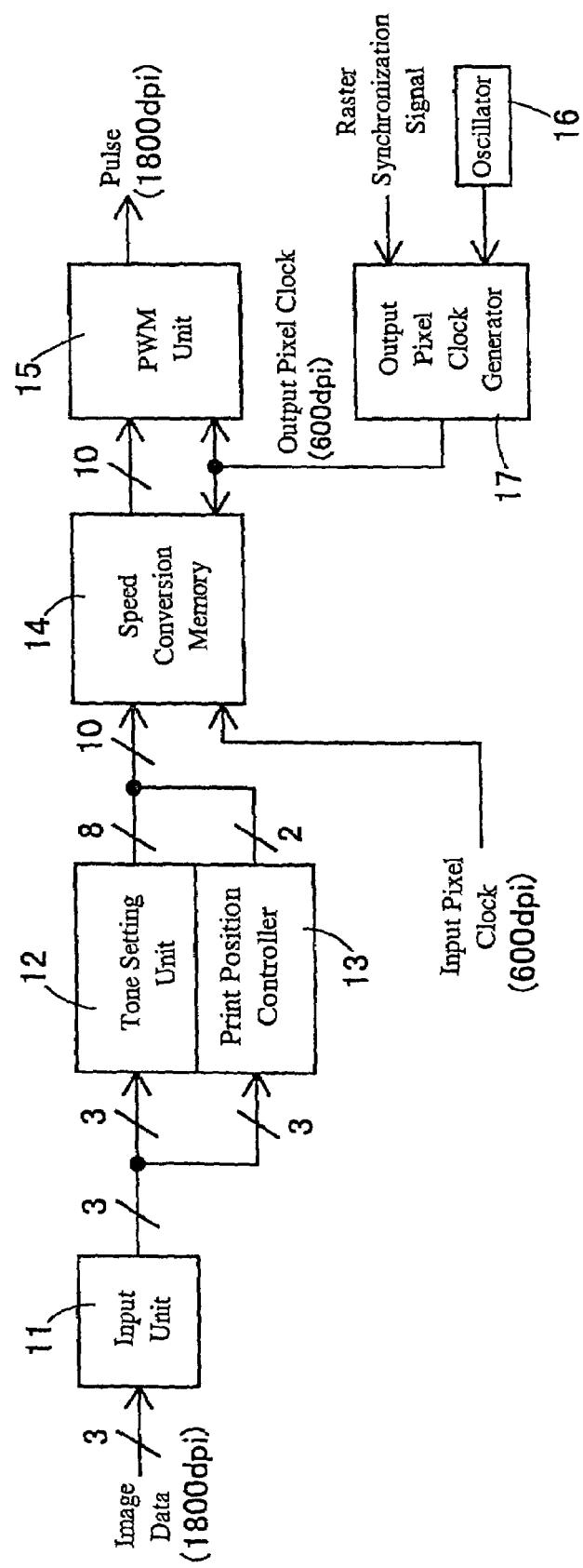
FIG. 1 is a block diagram showing the basic construction of an image forming apparatus pertaining to a first embodiment.

FIG. 1 shows the construction of the image data processing section of the image forming apparatus of this embodiment. The image data in this embodiment has 1,800 dpi binary image data, and the image data for one pixel has a one-bit length. This image forming apparatus has an input unit 11 that inputs the image data and divides it every three bits into data groups, a tone setting unit 12 that sets the tone based on the image data thus divided into groups, a print position controller 13 that sets the position attribute, a speed conversion memory 14 that controls for the difference in speed between the input section and the output section, and a pulse width modulation (PWM) unit 15 that outputs laser driver driving pulses. It further includes an oscillator 16 that generates clock pulse signals, and an output pixel clock generator 17 that outputs clock pulse signals in synchronization with raster synchronization signals. In this embodiment, the input unit 11 includes a dividing unit, and the print position controller 13 includes a position attribute setting unit.

As shown by the arrows in the drawing, image data is input from the input unit 11 to the tone setting unit 12 and the print position controller 13, where it is converted. After conversion, the image data is input to the speed conversion memory 14. The tone setting unit 12 and the print position controller 13 are described below. The speed conversion memory 14 is a FIFO memory. Data is written in the memory in synchronization with an input pixel clock signal, and is read therefrom in synchronization with an output pixel clock signal. Output pixel clock signal is generated by the output pixel clock generator 17, and is input to the speed conversion memory 14 and the pulse width modulation unit 15.

The pulse width modulation unit 15 receives input of 10-bit data having 2-bit attribute data and 8-bit tone data, and outputs a pulse corresponding to these sets of data. The pulse width modulation unit 15 determines the position for the pulse to be output based on the 2-bit attribute data as shown in FIG. 2. In other words, where the attribute data is '01', it outputs a pulse at the left end. Where the attribute data is '00', the pulse width modulation unit 15 outputs a pulse in the center position. Where the attribute data is '10', a pulse is output at the right end, and where the attribute data is '11', pulses are output at both ends. The numeric values shown in this description are based on the binary number system for 2-bit data. All numerical values in the following description are based on the binary number system other than those that are specifically excepted. The pulse width modulation unit 15 also determines the width of the pulse to be output based on the 8-bit tone data. The pulse width modulation unit 15 outputs a maximum-width pulse for one dot when the tone data is "8'd255". Generally, it outputs a pulse having a width that is obtained by multiplying the maximum width by "(tone data)/8'd255)". Here, "8'd" means that the 8-bit data is expressed using the decimal number system.

The numbers shown over the arrows in FIG. 1 each show the number of bits of the image data at each point. In other words, FIG. 1 shows that the image data divided by the input unit 11 into a data group is 3-bit data, which is then converted by the tone setting unit 12 and the print position controller 13, and 10-bit data is input to the pulse width modulation unit 15. The input pixel clock signal and the output pixel clock signal are both based on a 600 dpi resolution. The input pixel clock signal is a clock signal used for synchronization for the components involved in the input of image data to data processing. The output pixel clock signal is a clock signal used for synchronization between the pulses output from the pulse width modulation unit 15 and the print engine. The input pixel clock signal and output pixel clock signal may not have the same frequency, but have a clock frequency that is generally used in a conventional art image forming apparatus. Therefore, where operation is performed in synchronization with this frequency, no problem is experienced in the processing by the image processing section.

The data conversion by the tone setting unit 12 and the print position controller 13 will now be explained with reference to FIGS. 3 and 4. The tone setting unit 12 generates tone data to be input to the pulse width modulation unit 15 based on the 3-bit data input thereto. As described above, the pulse width modulation unit 15 can generate pulse widths based on the 8-bit tone data to express 256 tones. In other words, tone data is determined in accordance with the relationship shown in FIG. 3 based on the number of '1's included in the 3-bit image data when it is expressed using the binary number system. Where there is zero '1', tone data becomes zero as well, and no pulse is output. Where there is one '1', that corresponds to '8'd85', which is ⅓ of '8'd255'. Where there are two '1's, that corresponds to '8'd170', which is ⅔ of '8'd255'. Where there are three '1's, that corresponds to the maximum-width pulse. In other words, where there are (n) number of '1's in the input data, the value of the tone data is ('8'd255' n/3).

The pulse width modulation unit 15 can also adjust the pulse output position based on the attribute data described above. Therefore, the print position controller 13 generates attribute data to be input to the pulse width modulation unit 15 in accordance with the relationship shown in FIG. 2 based on the 3-bit data input thereto. The table indicates the position for the '1' bit when the 3-bit image data is expressed using the binary number system. For the purposes of data conversion by the tone setting unit 12 and the print position controller 13, the conversion table 21 shown in FIG. 4 is stored in the memory in advance such that it can be referred to when needed. The conversion table 21 includes an input data column 22, an attribute data column 23 and a tone data column 24.

The tone setting unit 12 searches the input data column 22 based on the input image data, and reads data from the corresponding cell of the tone data column 24. The print position controller 13 similarly reads data from the corresponding cell of the attribute data column 23. The values in the tone data column 24 are the values that correspond to the number of '1's included in the input data when it is expressed using the binary number system, and the values in the attribute data column 23 are values that correspond to the position of the '1'. Consequently, tone data and attribute data necessary to output a pulse or pulses corresponding to the arrangement of '1's in the input 3-bit image data is obtained, and is input to the pulse width modulation unit 15. In FIG. 4, the attribute data corresponding to the input data '000' and '111' was deemed '00' for the sake of convenience, but because this attribute data does not have any practical meaning, any value will do. In such cases, the output pulse should be controlled in accordance with the tone data.

Figure 5:
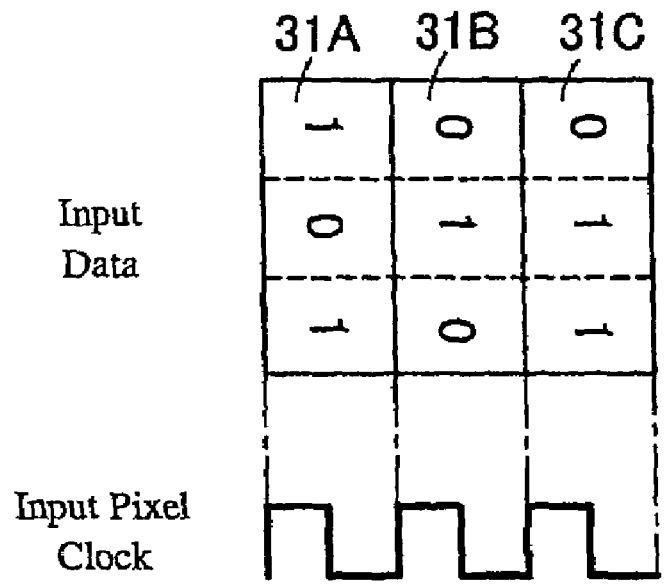
FIG. 5 is an explanatory drawing showing an example of data input to the image forming apparatus pertaining to the first embodiment.
Figure 6:
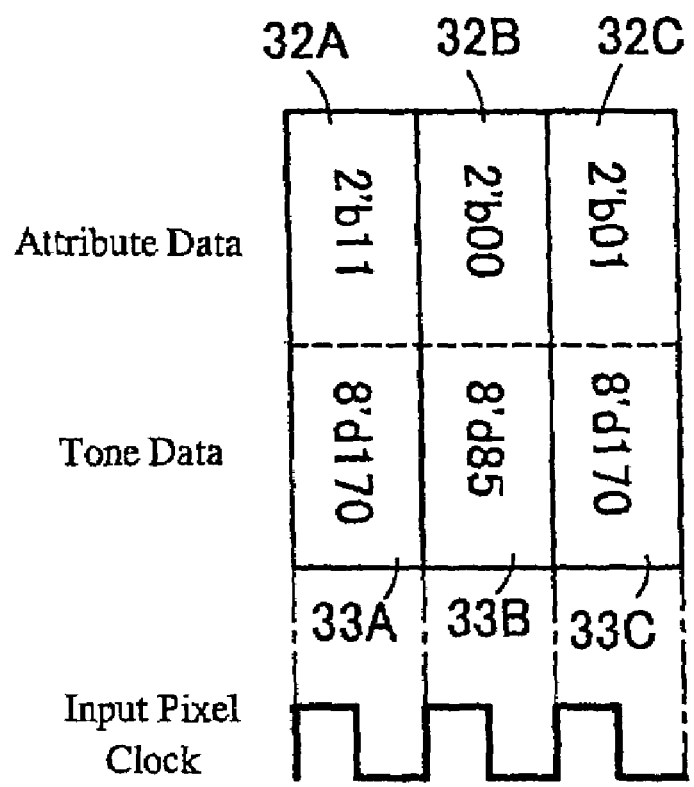
FIG. 6 is an explanatory drawing showing an example of output data generated in the image forming apparatus pertaining to the first embodiment.
Figures 7, 8, 9:
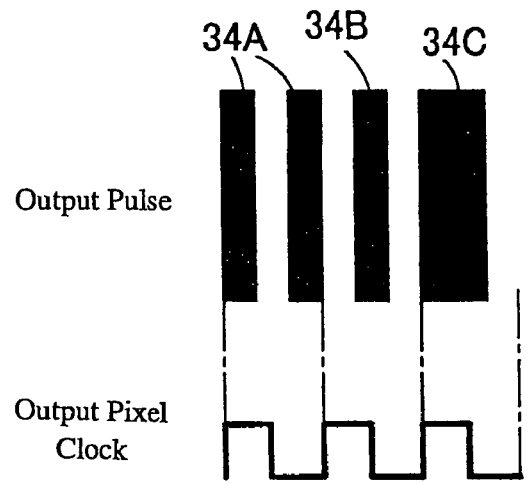
FIG. 7 is an explanatory drawing showing an example of pulses output in the image forming apparatus pertaining to the first embodiment.
FIG. 8 is a drawing pertaining a second embodiment that shows the relationship between the input data and the tone data regarding the tone setting unit.
FIG. 9 is a drawing showing a conversion table pertaining to the second embodiment.
Figure 10:
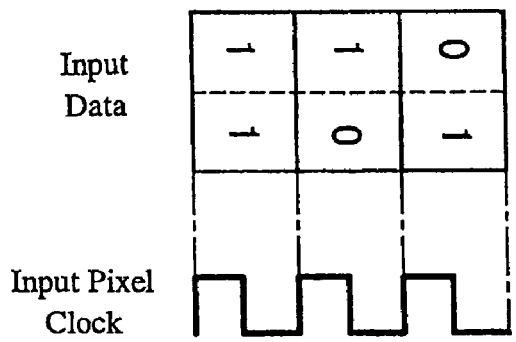
FIG. 10 is an explanatory drawing showing an example of data input to the image forming apparatus pertaining to the second embodiment.
Figure 11:
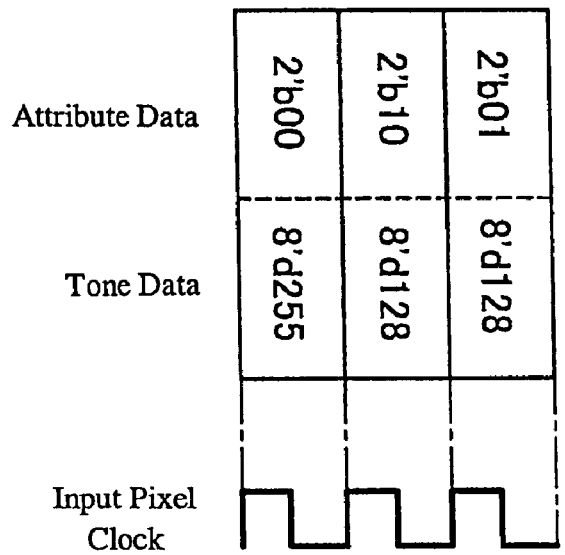
FIG. 11 is an explanatory drawing showing an example of output data generated in the image forming apparatus pertaining to the second embodiment.
Figure 12:
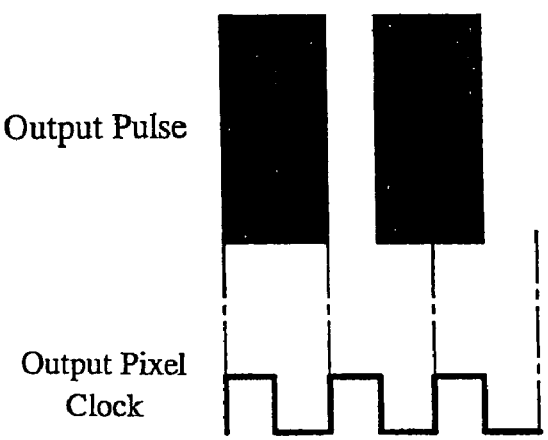
FIG. 12 is an explanatory drawing showing an example of pulses output in the image forming apparatus pertaining to the second embodiment.

The operation of this image forming apparatus will now be described in specific terms with reference to the examples shown in FIGS. 5, 6 and 7. First, 1,800 dpi binarized image data is input to the input unit 11, and is divided into groups of 3-bit data that correspond to three pixels. Each 3-bit image data group is input to the tone setting unit 12 and the print position controller 13 in synchronization with an input pixel clock signal. The example in FIG. 5 shows three input data groups, i.e., input data groups 31A with data '101', 31B with data '010' and 31C with data '011'. A search is carried out in the conversion table 21 for these data groups, tone data is obtained by the tone setting unit 12, and attribute data is obtained by the print position controller 13. As a result, as shown in FIG. 6, the attribute data 32A and the tone data 33A for the input data group 31A are '11' and '8'd170', respectively. Attribute data 32B and 32C and tone data 33B and 33C are also obtained.

These data sets are then stored in the speed conversion memory 14. This is done in order to absorb any difference in timing between the input pixel clock signal that is used for synchronization for the image input section and the output pixel clock signal that is used for synchronization for the image output section. In other words, the operations from the input of image data to the writing thereof in the speed conversion memory 14 are carried out based on the input pixel clock signal, and the operations from the reading of the data from the speed conversion memory 14 onward are carried out based on the output pixel clock signal. The attribute data and the tone data read from the speed conversion memory 14 in synchronization with an output pixel clock signal are input to the pulse width modulation unit 15. Based on these sets of data, the pulse width modulation unit 15 outputs pulses shown in FIG. 7. For example, for the input data group 32A, pulses are output at both ends because the corresponding attribute data 32A is '11', and the pulse width is ⅔ of the maximum width because the corresponding tone data 33A is '8'd170'. Therefore, two pulses 34A are output as shown in FIG. 7. Similarly, a pulse 34B is output based on the attribute data 32B and tone data 33B, and a pulse 34C is output based on the attribute data 32C and tone data 33C.

Accordingly, various pulses are created and output per group of three dots in response to an output pixel clock signal. In other words, output pulses corresponding to a 1,800 dpi resolution in the main scanning direction are formed based on output pixel clock signal used for a 600 dpi resolution and having the same frequency as that used in the conventional art apparatus.

As described in detail above, using the image forming apparatus of this embodiment, the input unit 11 inputs 3-bit data to the tone setting unit 12 and the print position controller 13 each time an input pixel clock signal is generated. The tone setting unit 12 and the print position controller 13 respectively convert this input data and generate 2-bit attribute data and 8-bit tone data. In other words, attribute data is determined based on the arrangement of ON pixels in the data group, and tone data is determined based on the ratio of the number of ON pixels to the total number of pixels in the data group. After the attribute data and tone data obtained through the conversion are input to the pulse width modulation unit 15, the pulse width modulation unit 15 outputs a pulse or pulses for three dots each time an output pixel clock signal is generated. Therefore, a resolution in the main scanning direction that is three times as high as the clock signal frequency is obtained without changing the input pixel clock signal or the output pixel clock signal. Accordingly, a high-speed image forming apparatus that offers a higher resolution in the main scanning direction can be provided.

Second Embodiment

A method in which a resolution of three times the clock signal frequency is obtained by dividing each clock signal into three was shown with regard to the image forming apparatus of the first embodiment. It is also possible to obtain a resolution of twice the clock signal frequency by dividing each clock signal into two. In this way, a 1,200 dpi resolution can be obtained using clock signal for a 600 dpi resolution. An example for this embodiment will be described with reference to FIGS. 9–12.

When doubling the resolution, the input data is divided into 2-bit data groups. The tone data in this case is converted as shown in FIG. 8. In other words, depending on the number of '1's in the input data, the tone data can be one of three possibilities, i.e., '0', '8'd128' representing ½ of the maximum width, or '8'd255' representing the maximum width. The conversion table 41 for this embodiment looks like the one shown in FIG. 9. Because the input data is 2-bit data, the input data column 42 has four cells. The attribute data for input data '00' and '11' may have any value in this conversion table 41 as well.

In this embodiment as well, the data input from the input unit 11 (see FIG. 10) is converted into tone data and attribute data (see FIG. 11) by the tone setting unit 12 and the print position controller 13, respectively, in the same manner as in the first embodiment. These sets of data are input to the pulse width modulation unit 15 via the speed conversion memory 14, and a pulse or pulses are output (see FIG. 12).

Accordingly, various pulses are created and output for every two dots in response to an output pixel clock signal. In other words, output pulses equivalent to a 1,200 dpi resolution in the main scanning direction are formed based on output pixel clock signal having the same frequency as in the conventional art for a 600 dpi resolution.

As described in detail above, according to the image forming apparatus of this embodiment, as in the first embodiment, a resolution in the main scanning direction that is higher than the conventional art is obtained without changing the input pixel clock signal or output pixel clock signal. In this second embodiment, a resolution of twice the clock signal frequency is obtained. As a result, a high-speed image forming apparatus having a high resolution in the main scanning direction can be provided.

These embodiments are mere examples, and do not limit the present invention in any way. Therefore, the present invention may naturally be improved and/or modified in various ways within its essential scope.

For example, in the above embodiments, an ON pixel for which the image data is '1' is a pixel for which the pulse width modulation unit 15 outputs a pulse and a dot is printed. However, the present invention can also be similarly implemented if an ON pixel is a pixel for which the pulse width modulation unit 15 does not output a pulse and a pixel for which the image data is '0' is a pixel for which a pulse is output.

As is clear from the description provided above, a high-speed image forming apparatus and image forming method that enable a high-speed apparatus to have a higher resolution in the main scanning direction can be provided.

Input image data is divided into data groups by a dividing unit, and each such data group is processed by a tone setting unit and a position attribute setting unit. The tone and position attributes for the data group are determined based on the values and arrangement of the pixels in the group. A pulse width modulation unit determines the width and intra-group position for a pulse or pulses based on the data sets for the group and performs exposure for each pixel. Therefore, the pulse width modulation unit is driven for each data group based on driving clock signal, and performs exposure of each pixel. In other words, using this image forming apparatus, relative to the frequency of the driving clock signal, a fine image can be formed. Consequently, the image forming apparatus of the above embodiment can achieve high resolution using low-speed clock signal, and high resolution in the main scanning direction can be achieved without excessive burden in a high-speed apparatus as well.

Where one data group includes data for two pixels, driving can be carried out based on clock signal having a half frequency, and an image can be formed exactly as intended, because whether the pulse or pulses should be located on the right or left can be determined based on whether the ON pixel is at the right end or left end.

Where one data group includes data for three pixels, driving can be carried out based on clock signal having a one-third frequency, and an image can be formed exactly as intended, because the position attribute can be determined based on the arrangement of the ON pixel(s).

In addition, due to the inclusion of a speed conversion memory, appropriate processing is obtained even if the processing speed of the tone setting unit and the position attribute setting unit and the processing speed of the pulse width modulation unit and its subsequent image forming components do not match.

What is claimed is:

1. An image forming apparatus that receives image data and forms an image based on the image data, the image forming apparatus comprising:
   a dividing unit that divides the input image data into data groups based on a prescribed number of pixels in main scanning direction;
   a tone setting unit that sets tone for each data group created by the dividing unit based on the number of pixels having a prescribed value in the data group;
   wherein the tone setting unit sets the tone based on the ratio of the number of ON pixels to the total number of pixels in the data group;
   a position attribute setting unit that sets the position attribute for each data group created by the dividing unit based on arrangement of pixels having a prescribed value in the data group; and
   a pulse width modulation unit that performs pulse width modulation in response to a driving clock signal corresponding to a resolution of the input image data divided by the number of pixels in a data group created by the dividing unit,
   wherein the pulse width modulation unit performs exposure of each pixel for output image based on the pulse width in accordance with the tone set by the tone setting unit and the intra-group position in accordance with the position attribute set by the position attribute setting unit.

2. The image forming apparatus as claimed in claim 1, wherein the image data received by the dividing unit is binary image data.

3. The image forming apparatus as claimed in claim 1, wherein the position attribute setting unit sets the position attribute based on the arrangement of the ON pixels in the data group.

4. The image forming apparatus as claimed in claim 1, the position attribute set by the position attribute setting unit includes right end position and left end position.

5. The image forming apparatus as claimed in claim 4, wherein the prescribed number of pixels based on which dividing is performed by the dividing unit is three or more, and
   the position attribute set by the position attribute setting unit further includes both end position and center position.

6. The image forming apparatus as claimed in claim 1, further comprising
   a speed conversion memory that stores set values set by the tone setting unit and the position attribute setting unit, and outputs the stored image data in response to the driving clock signals for the pulse width modulation unit.

* * * * *